(12) United States Patent
Harm et al.

(10) Patent No.: US 12,024,114 B2
(45) Date of Patent: *Jul. 2, 2024

(54) AIRBAG COVER STRUCTURE FOR STEERING WHEEL

(71) Applicant: HYUNDAI MOBIS CO., LTD., Seoul (KR)

(72) Inventors: Jae Jun Harm, Seoul (KR); Seok Hoon Ko, Yongin-si (KR); Do Hyoung Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/462,992

(22) Filed: Sep. 7, 2023

(65) Prior Publication Data
US 2023/0415693 A1    Dec. 28, 2023

Related U.S. Application Data

(63) Continuation of application No. 17/527,971, filed on Nov. 16, 2021, now Pat. No. 11,820,315.

(30) Foreign Application Priority Data

Dec. 1, 2020 (KR) .................... 10-2020-0165853

(51) Int. Cl.
*B60R 21/215* (2011.01)
*B60R 21/203* (2006.01)
*B60R 21/216* (2011.01)

(52) U.S. Cl.
CPC .......... *B60R 21/215* (2013.01); *B60R 21/203* (2013.01); *B60R 21/216* (2013.01); *B60R 2021/21543* (2013.01)

(58) Field of Classification Search
CPC ............. B60R 21/203; B60R 21/2035; B60R 21/2037; B60R 21/216; B60R 21/21656; B60R 2021/21543; B60R 2021/2161
See application file for complete search history.

(56) References Cited

U.S. PATENT DOCUMENTS 6,099,027 A    8/2000   Shirk
6,145,402 A   11/2000   Nishitani
(Continued)

FOREIGN PATENT DOCUMENTS

CN    202703493    1/2013
CN    110040077    7/2019
(Continued)

OTHER PUBLICATIONS

Chinese Office Action dated Mar. 22, 2023 issued in CN 202011467624.6.
(Continued)

*Primary Examiner* — Barry Gooden, Jr.
(74) *Attorney, Agent, or Firm* — DLA Piper LLP US

(57) ABSTRACT

An airbag cover structure for a steering wheel. The airbag cover structure with a lighting emblem includes: a mounting plate with an airbag cushion; an inner cover including an inner locking portion, a storage portion, and an inner hinge portion; an outer cover including an outer locking portion, an indicating portion, and an outer hinge portion; and an absorption area provided on the inner hinge portion of the inner cover, and configured to concentrate and absorb stress generated by a force that unfolds a bent portion of the outer hinge portion during deployment of the airbag cushion.

9 Claims, 11 Drawing Sheets

(56) References Cited

U.S. PATENT DOCUMENTS

| | | |
|---|---|---|
| 7,887,088 B2 | 2/2011 | Worrell |
| 8,925,959 B2 | 1/2015 | Bosch |
| 10,279,736 B2 | 5/2019 | Schneider et al. |
| 10,507,764 B2 | 12/2019 | Schneider et al. |
| 11,059,447 B2 | 7/2021 | Ide |
| 11,208,069 B2 | 12/2021 | Kang |
| 11,305,718 B2 * | 4/2022 | Ko .................... B60Q 3/283 |
| 11,383,639 B1 * | 7/2022 | Kwon .................. B60Q 3/64 |
| 11,453,358 B2 * | 9/2022 | Park .............. B60R 21/21656 |
| 11,628,780 B2 * | 4/2023 | Kim .............. B60R 21/21656 |
| | | 280/728.3 |
| 11,691,589 B2 * | 7/2023 | Kang ................ B60R 21/215 |
| | | 280/728.3 |
| 11,754,262 B1 * | 9/2023 | Kang ................ B60R 21/215 |
| | | 362/511 |
| 11,820,315 B2 * | 11/2023 | Harm .............. B60R 21/216 |
| 2001/0052694 A1 | 12/2001 | Schutz |
| 2002/0084634 A1 | 7/2002 | Adomeit |
| 2006/0125217 A1 | 6/2006 | Nakamura |
| 2007/0024034 A1 | 2/2007 | Thomas |
| 2007/0099465 A1 | 5/2007 | Ruetz |
| 2008/0090031 A1 | 4/2008 | Hirzmann |
| 2009/0121459 A1 | 5/2009 | Bostick |
| 2009/0218793 A1 | 9/2009 | Kraus |
| 2009/0273165 A1 | 11/2009 | Worrell |
| 2009/0315306 A1 | 12/2009 | Worrell |
| 2010/0102538 A1 | 4/2010 | Paxton |
| 2010/0104780 A1 | 4/2010 | Paxton |
| 2010/0107806 A1 | 5/2010 | Corinaldi |
| 2010/0194080 A1 | 8/2010 | Paxton |
| 2010/0201105 A1 | 8/2010 | Iwazato |
| 2011/0109066 A1 | 5/2011 | Rick |
| 2011/0116251 A1 | 5/2011 | Rick |
| 2011/0210534 A1 | 9/2011 | Sauer |
| 2012/0001406 A1 | 1/2012 | Paxton |
| 2013/0277952 A1 | 10/2013 | Jung |
| 2014/0145419 A1 | 5/2014 | Ishikawa |
| 2014/0210190 A1 | 7/2014 | Bosch |
| 2014/0210191 A1 | 7/2014 | Bosch |
| 2014/0352118 A1 | 12/2014 | Ko |
| 2015/0116979 A1 | 4/2015 | Farkas |
| 2016/0001807 A1 | 1/2016 | Hans |
| 2016/0025281 A1 | 1/2016 | Gardner |
| 2016/0121809 A1 | 5/2016 | Barros Alonso |
| 2017/0369022 A1 | 12/2017 | Kanto |
| 2018/0208111 A1 | 7/2018 | Lisseman |
| 2018/0244196 A1 | 8/2018 | Jablonski |
| 2019/0001879 A1 | 1/2019 | Ali |
| 2019/0001880 A1 | 1/2019 | Schneider |
| 2019/0001901 A1 | 1/2019 | Verwys |
| 2019/0071112 A1 | 3/2019 | Toddenroth |
| 2019/0322211 A1 | 10/2019 | Kim |
| 2019/0351860 A1 | 11/2019 | Ohki |
| 2020/0122672 A1 | 4/2020 | Murai |
| 2020/0164824 A1 | 5/2020 | Ide |
| 2020/0164825 A1 | 5/2020 | Ide |
| 2020/0172037 A1 | 6/2020 | Klaenhammer |
| 2020/0355867 A1 | 11/2020 | Kwon |
| 2020/0406848 A1 | 12/2020 | Kang |
| 2021/0061189 A1 | 3/2021 | Fujimori |
| 2021/0107400 A1 | 4/2021 | Erler |
| 2021/0261081 A1 | 8/2021 | Fujimura |
| 2021/0362668 A1 | 11/2021 | Park |
| 2022/0080919 A1 * | 3/2022 | Ko .................... B60R 21/203 |
| 2022/0169196 A1 * | 6/2022 | Harm ............... B60R 21/203 |

FOREIGN PATENT DOCUMENTS

| | | | |
|---|---|---|---|
| CN | 111655550 | 9/2020 | |
| DE | 102021200983 A1 * | 8/2022 | ........... B60R 13/005 |
| JP | 2009-096450 | 5/2009 | |
| JP | 5506630 | 5/2014 | |
| JP | 2016-505452 | 2/2016 | |
| KR | 2011-0074888 | 7/2011 | |
| KR | 10-1076195 | 10/2011 | |
| KR | 20210041823 A * | 4/2021 | ........... B60R 21/215 |
| KR | 20230126087 A * | 8/2021 | ........... B60R 21/215 |
| KR | 20220161966 A * | 12/2022 | ........... B60R 21/215 |
| KR | 20230083089 A * | 6/2023 | ........... B60R 21/215 |

OTHER PUBLICATIONS

Office Action dated Sep. 23, 2021 issued in U.S. Appl. No. 16/953,023, filed Nov. 19, 2020.

Notice of Allowance issued in U.S. Appl. No. 16/953,023 dated Jan. 24, 2022.

Chinese Office Action dated Jan. 2, 2024 issued in CN 202011467624.6.

Notice of Allowance dated Mar. 2, 2023 issued in KR 10-2020-0118580.

* cited by examiner

AIRBAG COVER STRUCTURE FOR STEERING WHEEL

CROSS REFERENCE TO RELATED APPLICATION

This application is a continuation of U.S. application Ser. No. 17/527,971, filed Nov. 16, 2021, which claims priority to Korean Patent Application No. 10-2020-0165853, filed Dec. 1, 2020. The entire contents of each application are incorporated by reference herein for all purposes.

BACKGROUND OF THE INVENTION

Field of the Invention

The present invention relates to an airbag cover structure for a steering wheel and, more particularly, to an airbag cover structure with a lighting emblem for a steering wheel.

Description of the Related Art

As the demand for vehicle safety increases, research on a device for protecting occupant safety continues.

A representative device among the occupant protection devices is an airbag. The airbag serves to reduce collision energy of a vehicle delivered to the occupant by being deployed between the occupant and the vehicle when the vehicle collides. The airbag is installed on front or side of the occupant.

In general, a steering wheel for steering a vehicle is installed in front of a driver, and an airbag is provided on the steering wheel.

To appeal to consumers of vehicles, an ornament called an emblem symbolizing a vehicle brand image such as a logo of a vehicle manufacturer or a product name of a vehicle is mounted on a portion of front and rear grill, a center portion of a trunk panel, and a driver airbag (DAB) cover at the center of the steering wheel, etc.

Recently, there has been a demand to provide a lighting function to the emblem mounted on the DAB cover for aesthetic effect and communication for a driver.

However, it is difficult to install the emblem with the lighting function (hereinafter referred to as 'lighting emblem') in the conventional general DAB because of fear of damage of the components providing the lighting function to the emblem and the airbag cover during deployment of the DAB and of scattering of fragments of the damaged components and airbag cover.

For example, when the lighting emblem is mounted to a portion of the vehicle, a lens, a circuit board, a mounting structure, etc. for realizing lighting should be mounted on a rear surface of the emblem. The components add an additional load to the DAB when the airbag is deployed, thereby causing a damage to the airbag cover. Therefore, in order to improve structural robustness of the airbag cover, recently, an inner cover structure in which the various components for realizing lighting are accommodated has been developed.

However, a deployment force of the airbag is still strong and thus causes a problem that even the inner cover is damaged.

The foregoing is intended merely to aid in the understanding of the background of the present invention, and is not intended to mean that the present invention falls within the purview of the related art that is already known to those skilled in the art.

SUMMARY OF THE INVENTION

Accordingly, the present invention has been made keeping in mind the above problem occurring in the related art, and the present invention is intended to provide an airbag cover structure with a lighting emblem for a steering wheel, wherein the airbag cover structure is configured to accommodate various components for realizing lighting and to prevent an airbag cover from being broken by absorbing stress generated during deployment of the airbag.

In order to achieve the above objective, according to one aspect of the present invention, there is provided an airbag cover structure for a steering wheel, the airbag cover structure including: a mounting plate in which an airbag cushion may be stored; an inner cover including: an inner locking portion provided at a first portion thereof and coupled to the mounting plate; a storage portion provided at a second portion thereof and coupled to an emblem module; and an inner hinge portion integrally formed with a portion between the inner locking portion and the storage portion, formed in a bent shape, and configured to rotate the storage portion when the bent shape is unfolded during deployment of the airbag cushion; an outer cover including: an outer locking portion provided at a first portion thereof and coupled to the mounting plate while covering the inner locking portion of the inner cover; an indicating portion provided at a second portion thereof and configured to expose the emblem module while covering the storage portion of the inner cover; and an outer hinge portion integrally formed with a portion between the outer locking portion and the indicating portion, formed in a bent shape, and configured to rotate the indicating portion when the bent portion is unfolded during deployment of the airbag cushion; and an absorption area provided on the inner hinge portion of the inner cover, and configured to concentrate and absorb stress generated by a force that may unfold the bent portion during deployment of the airbag cushion.

The mounting plate may have a protrusion stopper formed by protruding on an area thereof facing the inner locking portion of the inner cover, the inner locking portion of the inner cover may have an inner locking hole to lock the protrusion stopper as the protrusion stopper passes through the inner locking hole, and the outer locking portion of the outer cover may have an outer locking hole to lock the protrusion stopper as the protrusion stopper passes through the outer locking hole.

The storage portion of the inner cover may have a plurality of inner coupling holes around an area where the emblem module is stored, and the indicating portion of the outer cover may have a plurality of outer coupling protrusions coupled to the inner cover by passing through the inner coupling holes.

The emblem module may include: an emblem main body coupled to the storage portion of the inner cover, and in which an exposed portion with a predetermined shape may be formed by protruding on a first surface thereof, and a storage portion with a predetermined storing space may be formed on a second surface thereof; and a light source unit accommodated in the storage portion and configured to emitting light to the emblem main body, wherein the indicating portion of the outer cover may have emblem exposing holes through which the exposed portion of the emblem main body may pass and be exposed.

The absorption area formed on the inner hinge portion of the inner cover may have a thickness formed thinner than thicknesses of other areas of the inner cover.

The absorption area of the inner hinge portion of the inner cover may be formed in a width direction of the inner hinge portion.

The mounting plate may have at least one protrusion stopper formed by protruding on an area thereof facing the inner locking portion of the inner cover, the inner locking portion of the inner cover may have at least one inner locking hole to lock the at least one protrusion stopper as the at least one protrusion stopper passes through the inner locking hole, and the absorption area may be formed on an area, which may be defined by excluding a correspondent area extended from an area having the inner locking hole, on the basis of a longitudinal direction of the inner hinge portion.

The absorption area formed on the inner hinge portion of the inner cover may be at least one absorption hole formed by passing through the inner hinge portion in a thickness direction.

A plurality of absorption holes may be formed to be spaced apart from each other in a width direction of the inner hinge portion.

The mounting plate may have at least one protrusion stopper formed by protruding on an area thereof facing the inner locking portion of the inner cover, the inner locking portion of the inner cover may have at least one inner locking hole to lock the at least one protrusion stopper as the at least one protrusion stopper passes through the inner locking hole, and the absorption hole may be formed on an area, which may be defined by excluding a correspondent area extended from an area having the inner locking hole, on the basis of a longitudinal direction of the inner hinge portion.

According to the embodiment of the present invention, the absorption area capable of absorbing stress generated during deployment of the airbag is formed on the inner cover in which various components provided for realizing lighting are accommodated. Therefore, the inner cover can be prevented from being damaged and broken during deployment of the airbag.

The inner cover is formed in various shapes and sizes. Therefore, a rotation force of the inner cover can be controlled and the time at which the airbag is fully deployed can be precisely controlled.

BRIEF DESCRIPTION OF THE DRAWINGS

The above and other objectives, features, and other advantages of the present invention will be more clearly understood from the following detailed description when taken in conjunction with the accompanying drawings, in which.

DETAILED DESCRIPTION OF THE INVENTION

Figure 1:
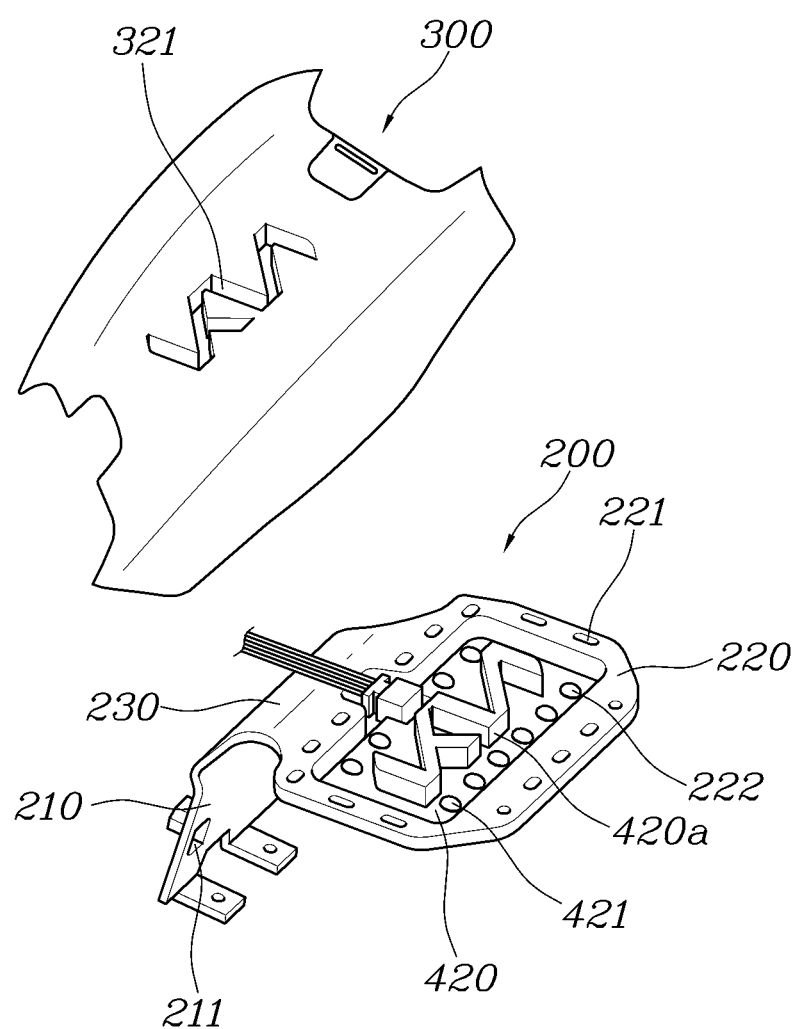
FIG. 1 is a perspective view showing an airbag cover structure for a steering wheel according to an embodiment of the present invention.
Figure 2:
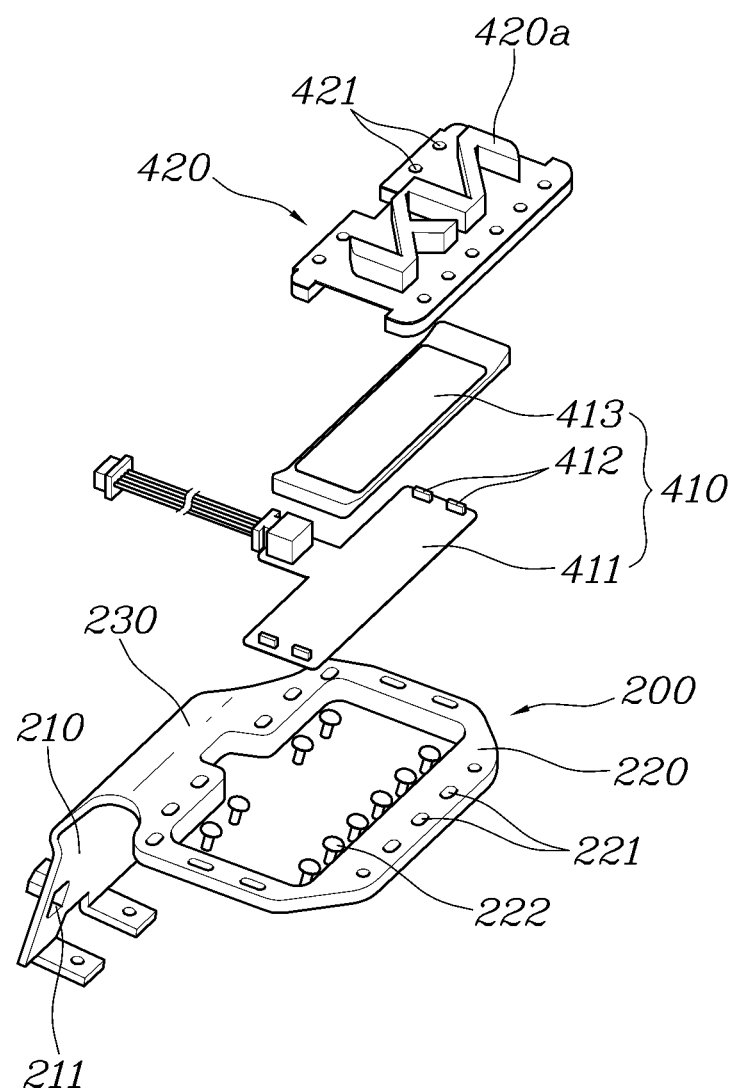
FIG. 2 is a disassembled-perspective view showing the airbag cover structure for a steering wheel according to the embodiment of the present invention.
Figure 3:
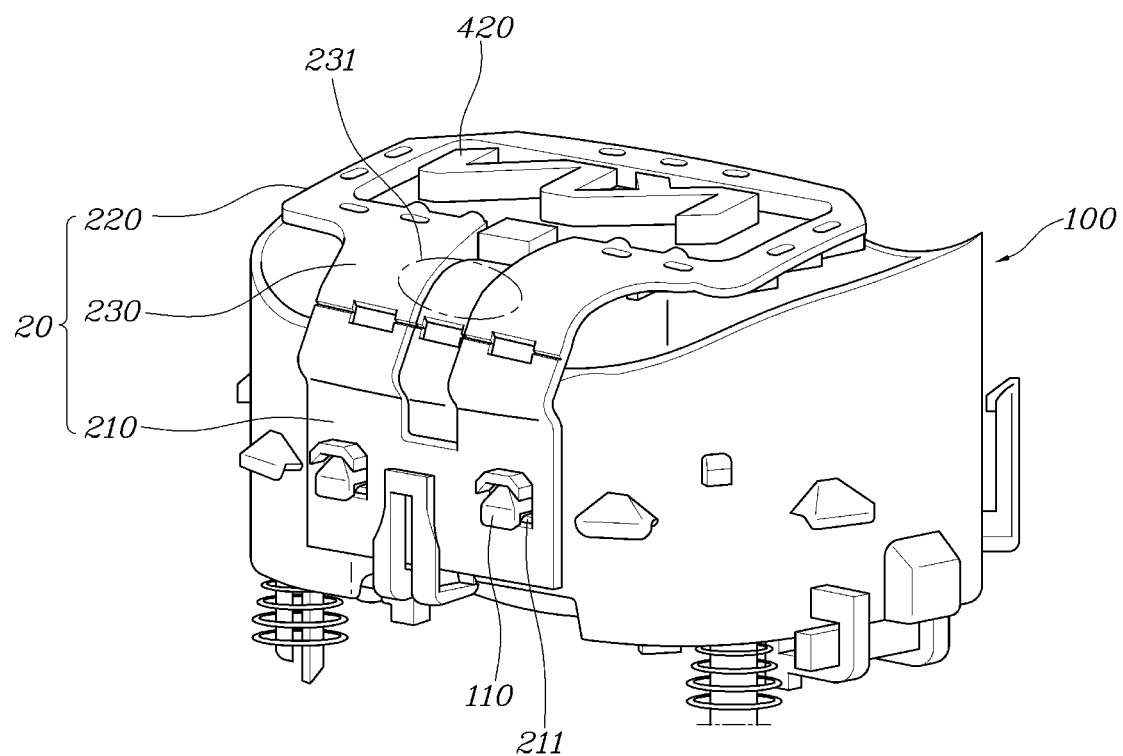
FIG. 3 is a view showing an assembled state of a main portion of the airbag cover structure for a steering wheel according to the present invention.
Figure 4:
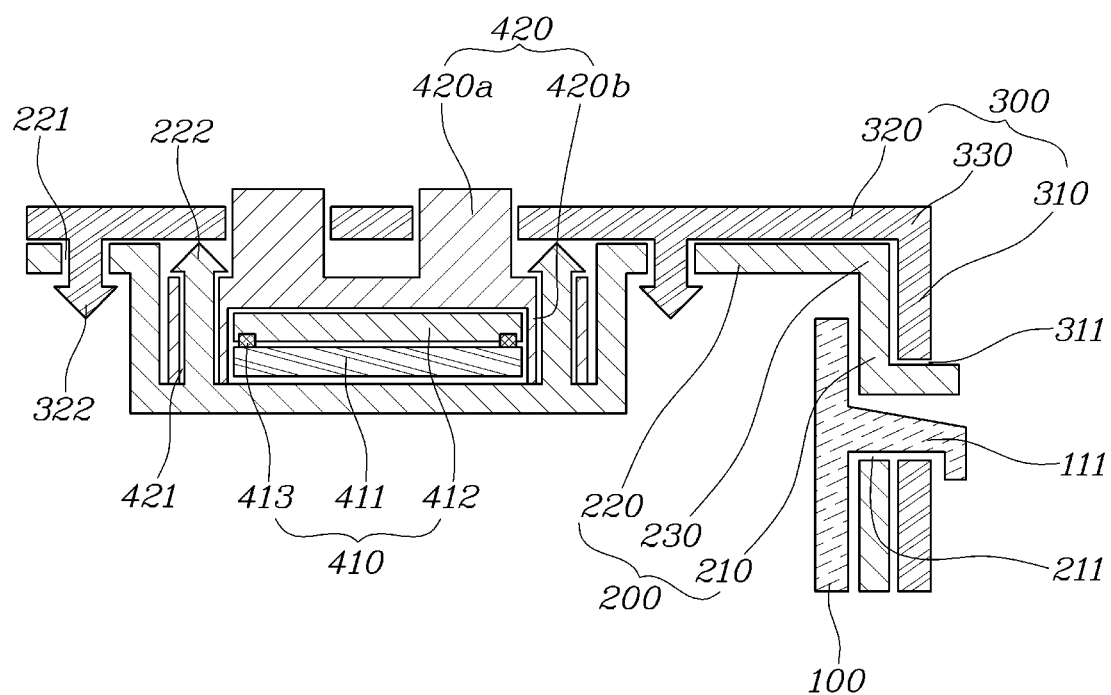
FIG. 4 is a view showing a section of the main portion of the airbag cover structure for a steering wheel according to the embodiment of the present invention.
Figure 5A:
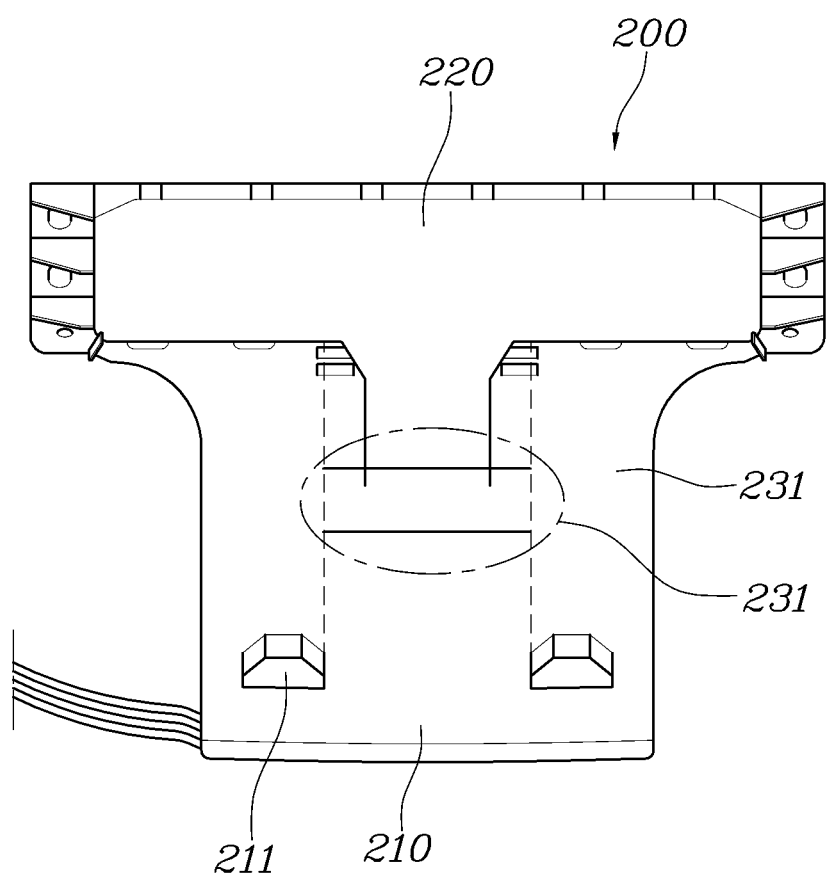
FIGS. 5A and 5B are views showing an absorption area of the airbag cover structure for a steering wheel according to the embodiment of the present invention.
Figure 5B:
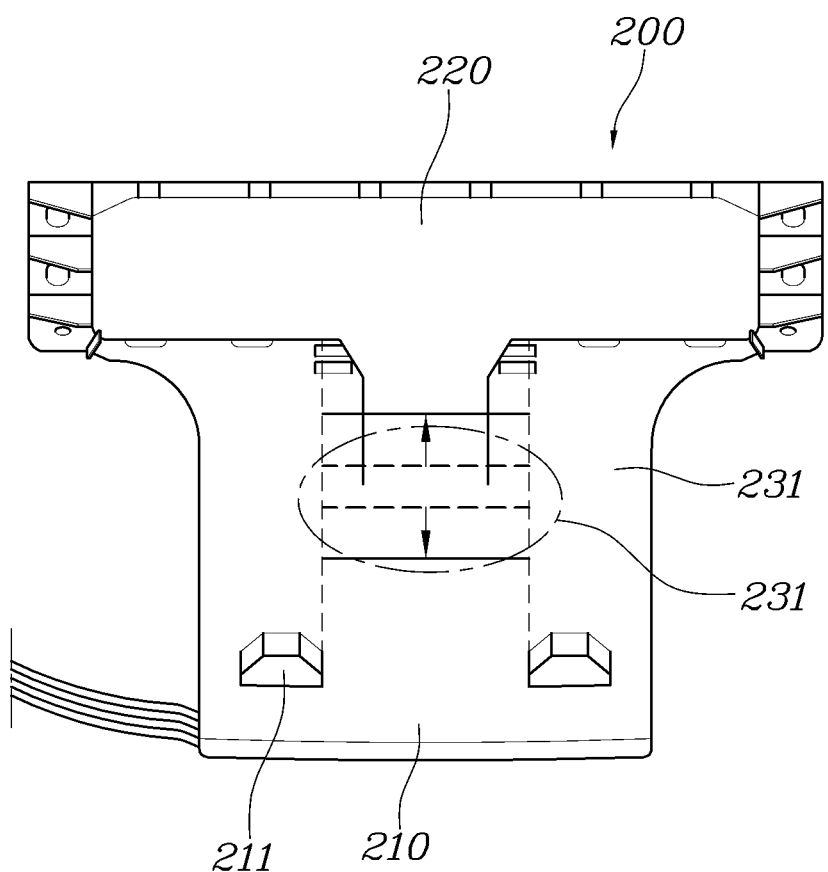
Figure 6A:
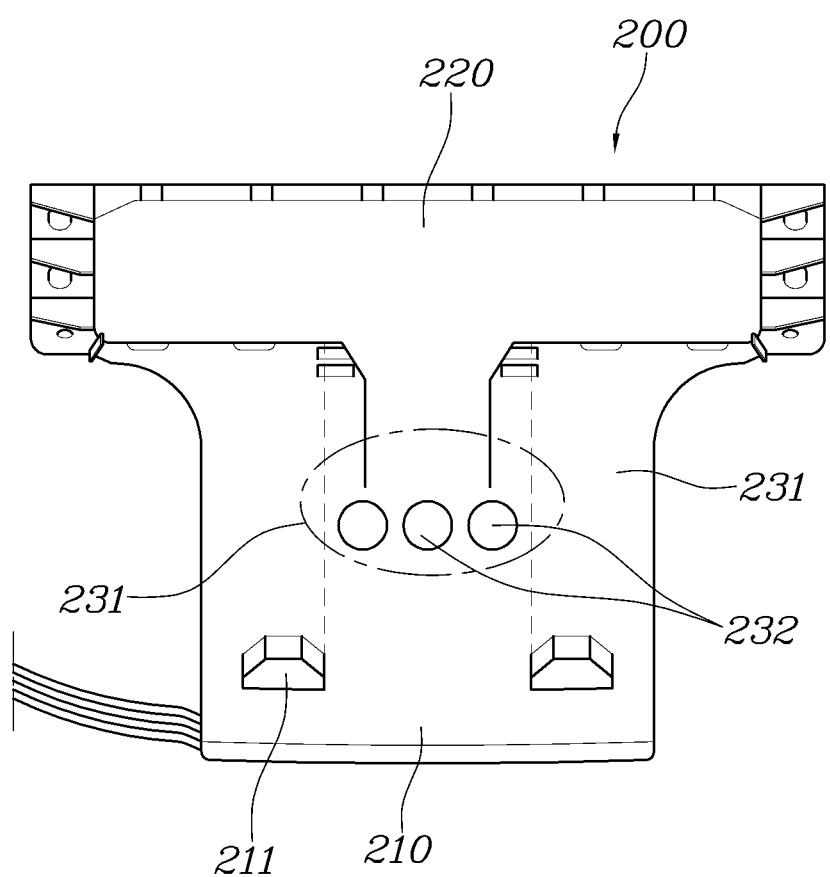
FIGS. 6A and 6B are views showing an absorption area of an airbag cover structure for a steering wheel according to a second embodiment of the present invention.
Figure 6B:
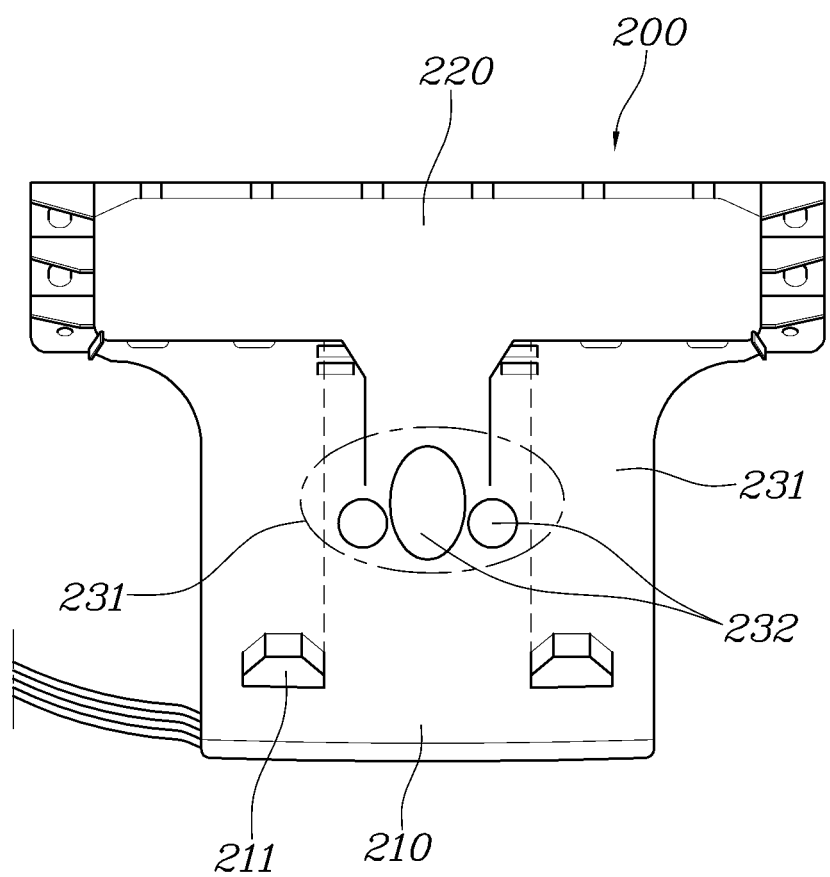

Hereinbelow, preferred embodiments of the present invention will be described in detail with reference accompanying drawings. It should be understood that the embodiments of the present invention may be changed to various embodiments and the scope and spirit of the present invention are not limited to the embodiments described hereinbelow. The embodiments of the present invention described hereinbelow are only provided for allowing those skilled in the art to more clearly comprehend the present invention. The same reference numerals will be used throughout the drawings to refer to the same or like elements or parts FIG. 1 is a perspective view showing an airbag cover structure for a steering wheel according to an embodiment of the present invention. FIG. 2 is a disassembled-perspective view showing the airbag cover structure for a steering wheel according to the embodiment of the present invention. FIG. 3 is a view showing an assembled state of a main portion of the airbag cover structure for a steering wheel according to the present invention. FIG. 4 is a view showing a section of the main portion of the airbag cover structure for a steering wheel according to the embodiment of the present invention. FIGS. 5A and 5B are views showing an absorption area of the airbag cover structure for a steering wheel according to the embodiment of the present invention. FIGS. 6A and 6B are views showing an absorption area of an airbag cover structure for a steering wheel according to a second embodiment of the present invention.

As shown in the drawings, the airbag cover structure for a steering wheel according to the embodiment of the present invention includes a mounting plate 100, an inner cover 200, and an outer cover 300.

The mounting plate 100 is a means in which the airbag cushion (not shown) is accommodated, and is embedded in a center portion of the steering wheel. The mounting plate 100 has a bottom surface and a side wall, an inside space in which the airbag cushion is accommodated, and an open upper end. Both the inner cover 200 and the outer cover 300 cover the open upper end of the mounting plate 100.

A protrusion stopper 110 is formed on the side wall of the mounting plate 100 for mounting the inner cover 200. At least of a pair of protrusion stoppers 110 is provided on the mounting plate 100 and is arranged to be spaced apart from each other at a predetermined interval in a width direction of the mounting plate 100.

The inner cover 200 is a means of which a first portion thereof is coupled to the side wall of the mounting plate 100 and a second portion thereof covers the open upper end of the mounting plate 100 and stores a means for providing a lighting function.

The inner cover 200 has the first portion in which an inner locking portion 210 coupled to the mounting plate 100 is formed and the second portion in which a storage portion 220 to which an emblem module 400 is mounted is formed. An inner hinge portion 230 is integrally formed on a portion between the inner locking portion 210 and the storage portion 220. The inner hinge portion 230 is formed in a bent state and rotates the storage portion 220 while the bent state thereof is unfolded during deployment of the airbag cushion. Therefore, the inner cover 200 is formed in a bent shape in which the storage portion 220, the inner hinge portion 230, and the inner locking portion 210 are bent in "¬"-shape.

The inner locking portion 210 of the inner cover 200 has inner locking holes 211 through which the protrusion stoppers 110 formed on the mounting plate 100 pass and are locked. As the inner locking holes 211 are formed to correspond to a position on which the protrusion stoppers 110 are formed, a pair of inner locking holes 211 is provided in a width direction of the inner cover to be spaced apart from each other at a predetermined interval.

The storage portion 220 of the inner cover 200 has a storage space in which the emblem module 400 is stored, and a plurality of inner coupling holes 221 is formed around an area storing the emblem module 400 for coupling the inner cover to the outer cover 300.

The storage portion 220 of the inner cover 200 has a plurality of inner coupling protrusions 222 along an edge of the area storing the emblem module 400 for mounting the emblem module 400.

The inner hinge portion 230 of the inner cover 200 has an absorption area 231. At the absorption area 231, stress (hereinbelow, which will refer to deployment stress) generated by a force that unfolds the bent state of the absorption area 231 during deployment of the airbag cushion stored in the mounting plate 100 is concentrated and absorbed.

The absorption area 231 may be realized in various shapes capable of concentrating the deployment stress and absorbing energy of the stress.

For example, as shown in FIG. 5A, the absorption area 231 may be realized with a thickness formed thinner than other areas. Therefore, as shown in FIG. 5B, when the inner hinge portion 230 is unfolded from the bent state during deployment of the airbag cushion, the deployment stress is concentrated on the absorption area 231 so as to stretch the absorption area 231, whereby other areas may be prevented from being broken.

Preferably, the absorption area 231 may be formed in a width direction of the inner hinge portion 230. Accordingly, the deployment stress may be uniformly distributed in the width direction of the inner hinge portion 230 during unfolding the inner hinge portion 230.

In order to prevent the inner hinge portion 230 from being broken when the deployment stress is concentrated on the absorption area 231 during unfolding of the inner hinge portion 230, the absorption area 231 is preferably formed in the area defined by excluding a correspondent area extended from an area having the inner locking holes 211, on the basis of a longitudinal direction of the inner hinge portion 230. More preferably, the absorption area 231 may be formed on the corresponding area extended from an area between the pair of inner locking holes 211.

As shown in FIG. 6A, the absorption area 231 may be realized as at least one absorption hole 232 passing through the inner hinge portion 230 in a thickness direction of the inner hinge portion 230. Therefore, as shown in FIG. 6B, when the inner hinge portion 230 is unfolded from the bent state during deployment of the airbag cushion, the deployment stress is concentrated on at least one absorption hole 232 so as to stretch the absorption hole 232, whereby other areas may be prevented from being broken.

Preferably, a plurality of absorption holes 232 may be formed in the width direction of the inner hinge portion 230. Accordingly, the deployment stress may be uniformly distributed in the width direction of the inner hinge portion 230 during unfolding the inner hinge portion 230.

In order to prevent the inner hinge portion 230 from being damaged and broken when the deployment stress is concentrated on the absorption holes 232 during unfolding of the inner hinge portion 230, the absorption holes 232 are preferably formed in the area defined by excluding a correspondent area extended from an area having the inner locking holes 211, on the basis of a longitudinal direction of the inner hinge portion 230. More preferably, the absorption holes 232 may be formed on the corresponding area extended from an area between the pair of inner locking holes 211.

The emblem module 400 is an emblem amplified with a lighting function, and is coupled to the storage portion of the inner cover 200. The emblem module 400 includes: an emblem main body 420, which has an exposed portion 420a formed on a first surface thereof by protruding with a predetermined shape, and a storage portion 420b formed on a second surface thereof with a predetermined storing space; and a light source unit 410 accommodated in the storage portion 420b and emitting light to the emblem main body 420.

The storage portion of the emblem main body 420 has emblem coupling holes 421 formed along an edge thereof, and the emblem coupling holes 421 are coupled to the inner coupling protrusions 222 formed on the storage portion 220 of the inner cover 200 as the inner coupling protrusions 222 pass therethrough. Therefore, the emblem main body 420 is coupled to the storage portion 220 of the inner cover 200, as the inner coupling protrusions 222 pass through the emblem coupling holes 421.

The emblem main body 420 is a means that is exposed to the driver and realizes an image of the vehicle brand, and may be realized using transparent, translucent, and partially opaque materials according to design requirements. In addition, a surface of the exposed portion 420a of the emblem main body 420 may be coated with pigments to express various colors.

The light source unit 410 is a means that emits light to the emblem main body 420 to provide the lighting function to the emblem main body 420. The light source unit 410 may include: a circuit board 411 accommodated in the storage portion 220 of the inner cover 200 and mounted to the storage portion 420b of the emblem main body 420; a light emitting diode (LED) 412 embedded in the circuit board 411; and a lens 413 accommodated in the storage portion 420b and guiding a path of the light emitted from the LED 412.

Therefore, The LED 412 emits light by receiving an electrical signal from the outside and thus radiating the light.

The lens 413 is a means that radiates the light emitted from the LED 412 uniformly over the whole area of the emblem main body 420, and various shaped lenses may be used. In addition, if necessary, the light source unit 410 may be realized as the lens 413 may be omitted.

The outer cover 300 is a means that forms an outer surface of the steering wheel. The outer cover 300 is a means of which a first portion is coupled to the side wall of the mounting plate 100 and a second portion covers the inner cover 200 and exposes the exposed portion 420a of the emblem main body 420.

Therefore, the outer cover 300 has an outer locking portion 310 that is formed on a first portion of the outer cover and is installed to the mounting plate 100 while covering the inner locking portion 210 of the inner cover 200, and an indicating portion 320 that is formed on a second portion of the outer cover and exposes the emblem module 400 while covering the storage portion 220 of the inner cover 200. An outer hinge portion 330 is integrally formed on a portion between the outer locking portion 310 and the indicating portion 320, and the outer hinge portion 330 is formed in a bent state and rotating the indicating portion 320 when the bent state thereof is unfolded during deployment of the airbag cushion. Therefore, the outer cover 300 is formed in a bent shape in which the indicating portion 320, the outer hinge portion 330, and the outer locking portion 310 are bent in a "¬"-shape.

The outer locking portion 310 of the outer cover 300 has outer locking hole 311 through which the protrusion stoppers 110 formed on the mounting plate 100 pass and are locked. As the outer locking holes 311 are formed to correspond to positions on which the protrusion stoppers 110 are formed, a pair of outer locking holes 311 is provided in a width direction of the outer cover to be spaced apart from each other at a predetermined interval.

The indicating portion 320 of the outer cover 300 has emblem exposing holes 321 through which the exposed portion 420a of the emblem main body 420 passes and is exposed. Therefore, the exposed portion 420a of the emblem main body 420 passes through each of the emblem exposing holes 321 and is exposed to the driver.

In addition, a plurality of outer coupling protrusions 322 may be formed on the indicating portion 320 of the outer cover 300, wherein the outer coupling protrusions 322 pass through and are coupled to the inner coupling holes 221 to couple the inner cover 200 to the outer cover. Therefore, as the outer coupling protrusions 322 of the outer cover 300 pass through and are coupled to the inner coupling holes 221 of the inner cover 200, the indicating portion 320 of the outer cover 300 may be coupled to the storage portion 220 of the inner cover 200.

Hereinbelow, an operating state of the airbag cover structure for a steering wheel according to the present invention configured as described above when the airbag cushion is deployed.

Figure 7A:
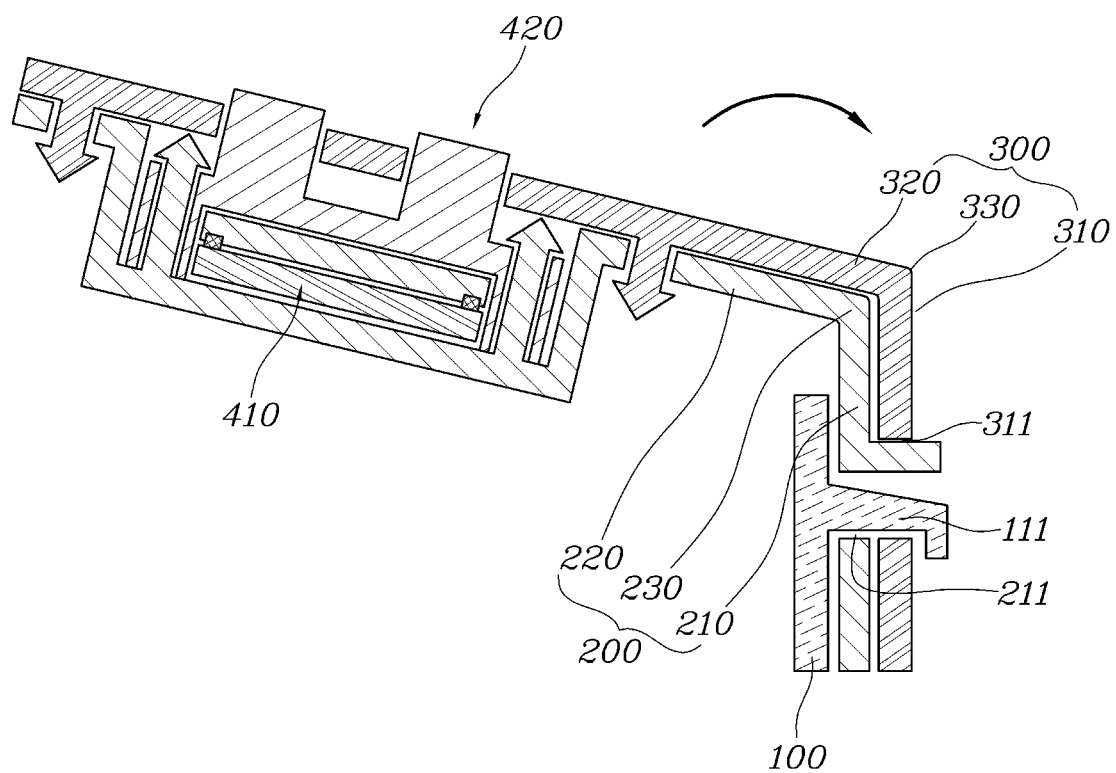
FIGS. 7A to 7C are views showing a rotating state of the airbag cover structure for a steering wheel according to the embodiment of the present invention.
Figure 7B:
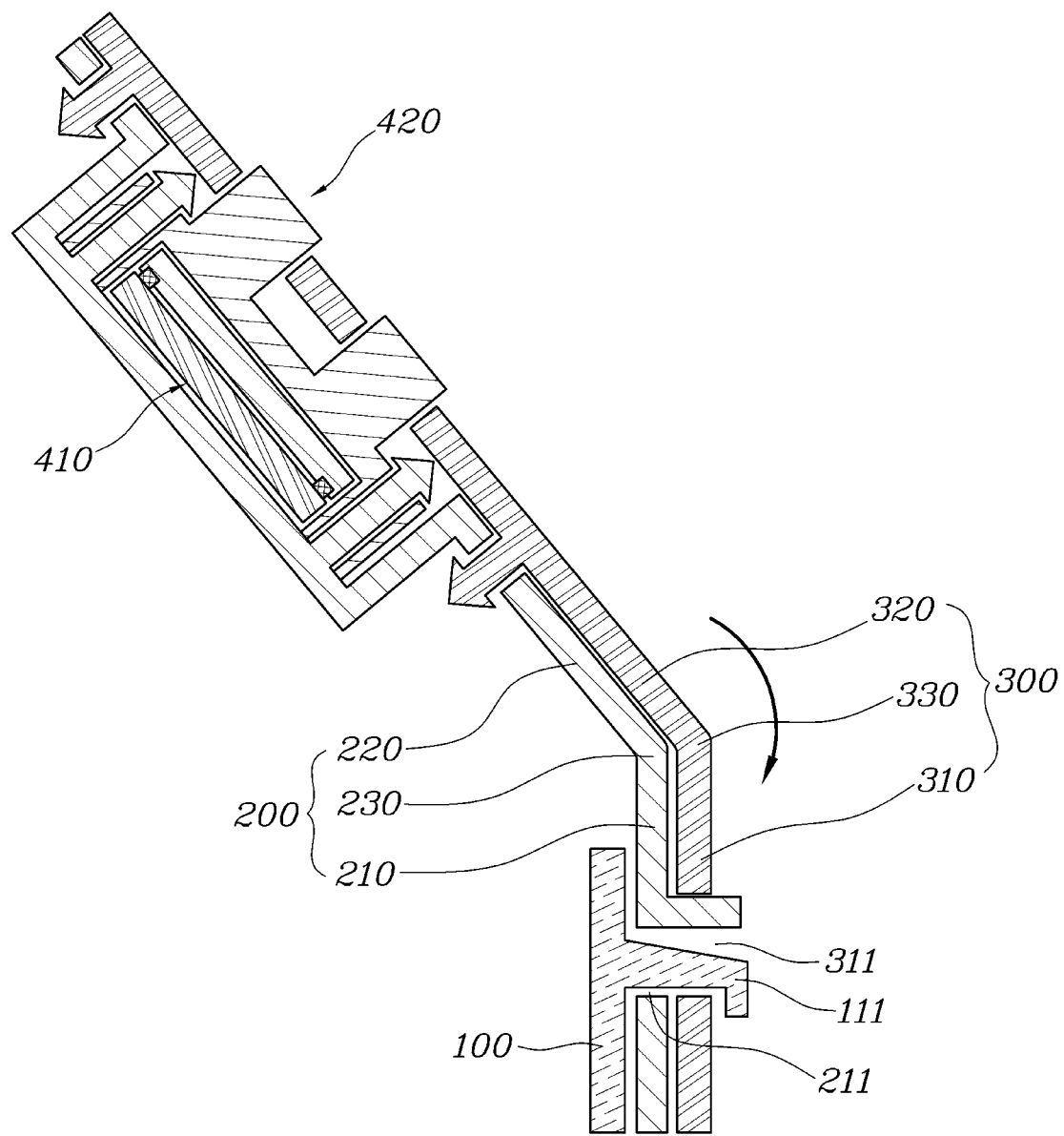
Figure 7C:
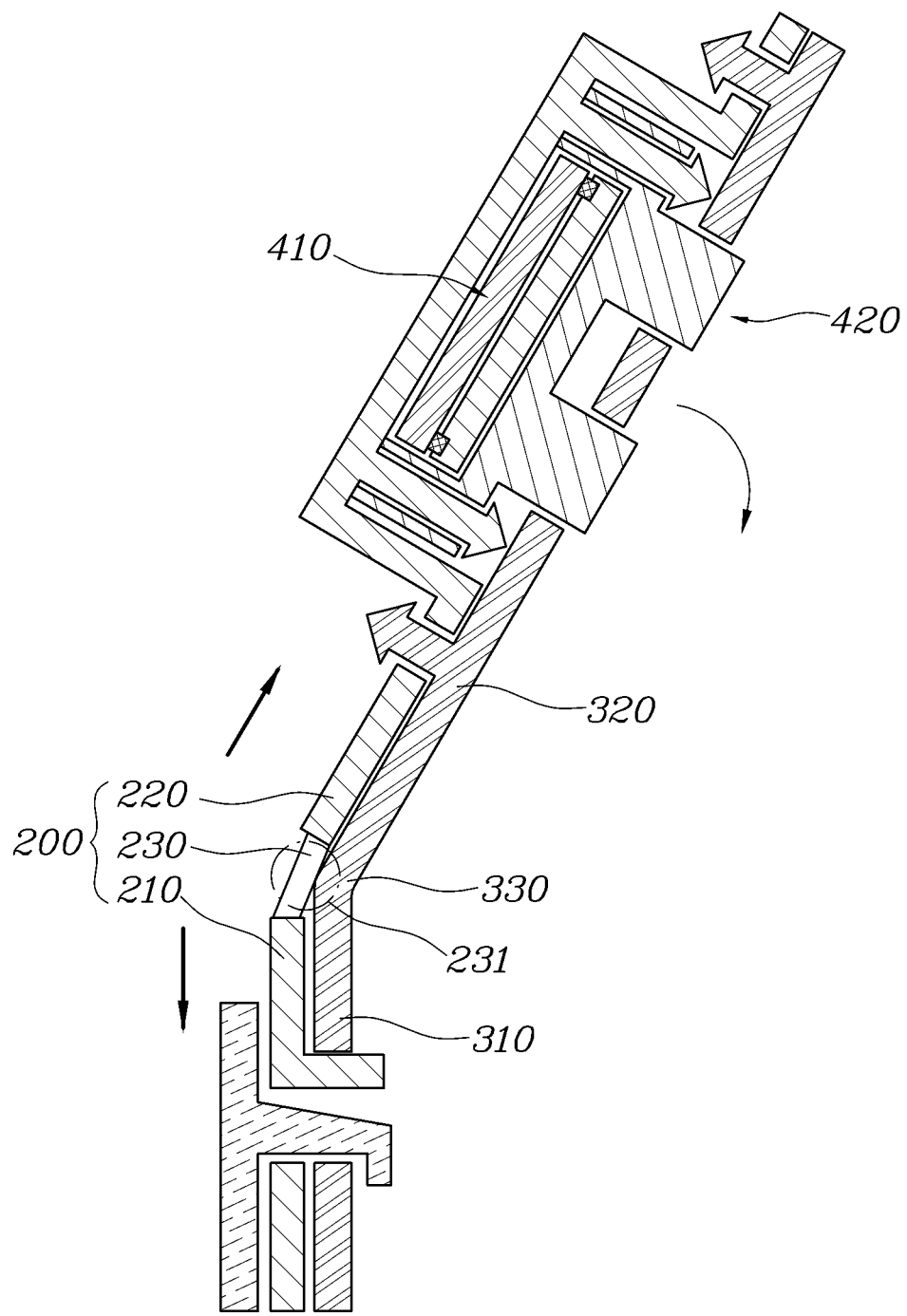

FIGS. 7A to 7C are views showing a rotating state of the airbag cover structure for a steering wheel according to the embodiment of the present invention.

When deployment of the airbag cushion starts as shown in FIGS. 7A and 7B, the airbag cushion is deployed, whereby the inner cover 200 and the outer cover 300 are entirely rotated.

At the beginning of rotation, the deployment stress is generated from the inner hinge portion 230 of the inner cover 200 and the outer hinge portion 330 of the outer cover 300, and the inner locking hole 211 of the inner cover 200 and the outer locking holes 311 of the outer cover 300.

However, as the rotation progresses, the deployment stress increases, and the increasing deployment stress is concentrated on the absorption area 231 formed on the inner hinge portion 230 of the inner cover 200.

Therefore, as the rotation progresses, the absorption area 231 is intensively stretched by the deployment stress concentrated on the absorption area 231, as shown in FIG. 7C. As the deployment stress that relatively affects the area of the inner hinge portion 230 of the inner cover 200 other than the absorption area 231, the outer hinge portion 330 of the outer cover 300, the inner locking hole 211 of the inner cover 200, and the outer locking holes 311 of the outer cover 300 are reduced, it is possible to prevent the inner hinge portion 230 and the outer hinge portion 330 from being broken or to prevent the inner locking hole 211 of the inner cover 200 and the outer locking holes 311 of the outer cover 300 from being damaged.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. It is thus well known to those skilled in that art that the present invention is not limited to the embodiments disclosed in the detailed description, and the patent right of the present invention should be defined by the scope and spirit of the invention as disclosed in the accompanying claims.

What is claimed:

1. An airbag cover structure for a steering wheel, the airbag cover structure comprising:
    a mounting plate in which an airbag cushion is stored;
    an inner cover comprising: an inner locking portion provided at a first portion thereof and coupled to the mounting plate; a storage portion provided at a second portion thereof and coupled to an emblem module; and an inner hinge portion integrally formed with a portion between the inner locking portion and the storage portion, having a bent shape, and configured to rotate the storage portion when the bent shape of the inner cover is unfolded during deployment of the airbag cushion;
    an outer cover comprising: an outer locking portion provided at a first portion thereof and coupled to the mounting plate while covering the inner locking portion of the inner cover; an indicating portion provided at a second portion thereof and configured to expose the emblem module while covering the storage portion of the inner cover; and an outer hinge portion integrally formed with a portion between the outer locking portion and the indicating portion, having a bent shape, and configured to rotate the indicating portion when the bent shape of the outer cover is unfolded during the deployment of the airbag cushion; and
    an absorption area provided on the inner hinge portion of the inner cover, and configured to concentrate and absorb stress generated by a force that unfolds the bent shape of the inner cover during the deployment of the airbag cushion,
wherein the emblem module comprises:
    an emblem main body coupled to the storage portion of the inner cover, and in which an exposed portion with a predetermined shape protrudes on a first surface thereof and a storage portion with a predetermined storing space is on a second surface thereof; and
    a light source unit accommodated in the storage portion of the emblem main body and configured to emit light to the emblem main body,
    wherein the indicating portion of the outer cover has emblem exposing holes through which the exposed portion of the emblem main body passes and is exposed.

2. The airbag cover structure of claim 1, wherein the mounting plate has a protrusion stopper facing the inner locking portion of the inner cover,
    the inner locking portion of the inner cover has an inner locking hole to lock the protrusion stopper as the protrusion stopper passes through the inner locking hole, and
    the outer locking portion of the outer cover has an outer locking hole to lock the protrusion stopper as the protrusion stopper passes through the outer locking hole.

3. The airbag cover structure of claim 1, wherein the storage portion of the inner cover has a plurality of inner coupling holes around an area where the emblem module is stored, and the indicating portion of the outer cover has a plurality of outer coupling protrusions coupled to the inner cover by passing through the inner coupling holes.

4. The airbag cover structure of claim 1, wherein the absorption area on the inner hinge portion of the inner cover has a thickness that is thinner than thicknesses of other areas of the inner cover.

5. The airbag cover structure of claim 4, wherein the absorption area of the inner hinge portion of the inner cover is in a width direction of the inner hinge portion.

6. The airbag cover structure of claim 4, wherein the mounting plate has at least one protrusion stopper protruding on an area thereof facing the inner locking portion of the inner cover, the inner locking portion of the inner cover has at least one inner locking hole to lock the at least one protrusion stopper as the at least one protrusion stopper passes through the at least one inner locking hole, and the absorption area is an area, which is defined by excluding a correspondent area extended from an area having the inner locking hole, based on a longitudinal direction of the at least one inner hinge portion.

7. The airbag cover structure of claim 1, wherein the absorption area on the inner hinge portion of the inner cover is at least one absorption hole passing through the inner hinge portion in a thickness direction.

8. The airbag cover structure of claim 7, wherein a plurality of the at least one absorption hole are spaced apart from each other in a width direction of the inner hinge portion.

9. The airbag cover structure of claim 7, wherein the mounting plate has at least one protrusion stopper protruding on an area thereof facing the inner locking portion of the inner cover, the inner locking portion of the inner cover has at least one inner locking hole to lock the at least one protrusion stopper as the at least one protrusion stopper passes through the at least one inner locking hole, and the at least one absorption hole is on an area, which is defined by excluding a correspondent area extended from an area having the at least one inner locking hole, based on a longitudinal direction of the inner hinge portion.

* * * * *